(12) United States Patent
Bensaou et al.

(10) Patent No.: US 6,747,976 B1
(45) Date of Patent: Jun. 8, 2004

(54) DISTRIBUTED SCHEDULING ARCHITECTURE WITH EFFICIENT RESERVATION PROTOCOL AND DYNAMIC PRIORITY SCHEME FOR WIRELESS ATM NETWORKS

(75) Inventors: Brahim Bensaou, Kowloon (HK); Kee Chaing Chua, Singapore (SG); Chi Hang Tse, Singapore (SG)

(73) Assignee: Centre for Wireless Communications of The National University of Science (SG)

( * ) Notice: Subject to any disclaimer, the term of this patent is extended or adjusted under 35 U.S.C. 154(b) by 694 days.

(21) Appl. No.: 09/626,008

(22) Filed: Jul. 26, 2000

(30) Foreign Application Priority Data

May 23, 2000 (SG) ........................... 2000 02836-5

(51) Int. Cl.[7] ................................. H04L 12/56
(52) U.S. Cl. ..................... 370/395.4; 370/395.43
(58) Field of Search ................ 370/328, 338, 370/395.1, 395.21, 395.43, 310.1, 395.4

(56) References Cited

U.S. PATENT DOCUMENTS

| | | | | |
|---|---|---|---|---|
| 5,684,791 A | * | 11/1997 | Raychaudhuri et al. | 370/278 |
| 6,034,960 A | * | 3/2000 | Beshai et al. | 370/395 |
| 6,064,649 A | * | 5/2000 | Johnston | 370/232 |
| 6,615,382 B1 | * | 9/2003 | Kang et al. | 714/748 |

* cited by examiner

Primary Examiner—Kenneth Vanderpuye
(74) Attorney, Agent, or Firm—Ladas & Parry

(57) ABSTRACT

The present distributed scheduling architecture comprise a hierarchy of schedulers comprising one master scheduler and many slave schedulers. The master scheduler is located at the AP. Its basic role is to allocate physical bandwidth to the different terminals. The slave scheduler is located in the data link control layer of a wireless terminal and one is located in the AP. It is important to note that at the AP, both master scheduler and slave scheduler (AP) co-exist while at the wireless terminals only slave schedulers (WT) are implemented. The rationale behind this architecture, is that the AP allocates time slots to the wireless terminals based on the information it receives through the reservation protocol, however, to cope with the problem of this information being out of date, the wireless terminals are allowed to freely distribute the allocated slots among their connections.

10 Claims, 9 Drawing Sheets

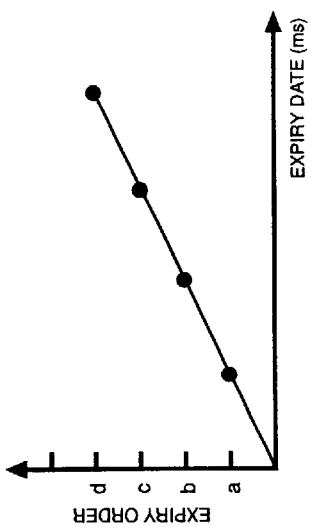
FIG. 4(A)
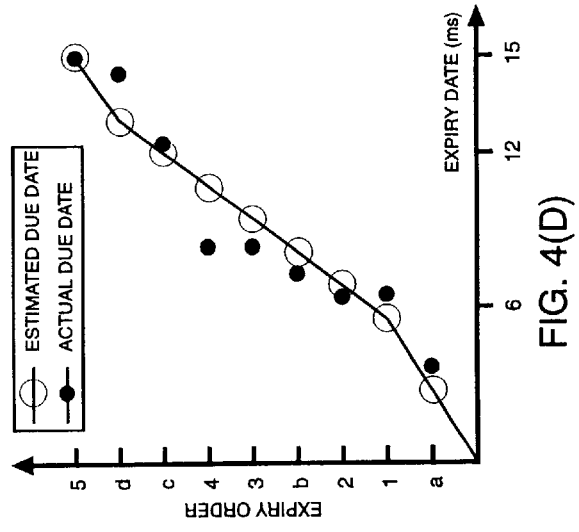
FIG. 4(B)
FIG. 4(D)
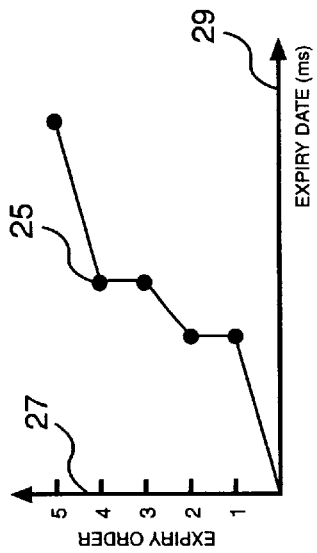
FIG. 4(C)

DISTRIBUTED SCHEDULING ARCHITECTURE WITH EFFICIENT RESERVATION PROTOCOL AND DYNAMIC PRIORITY SCHEME FOR WIRELESS ATM NETWORKS

FIELD OF THE INVENTION

The present invention relates generally to the field of wireless telecommunication, and particularly to the field of wireless asynchronous transfer mode (ATM) scheduling technology.

BACKGROUND OF THE INVENTION

Due to its ability to provide elaborate quality of service guarantees, asynchronous transfer mode (ATM) is deemed as one of the technologies of choice for wide area networks (WAN) as well as local access network (LAN). Multimedia services, such as speech, video conferencing and computer communications could be integrated and served under one unified network using the ATM technique. In parallel to the development of the ATM technology, wireless and mobile communication services have been growing in popularity exponentially. As the demand for better and more reliable services increases, the next generation wireless mobile networks may adopt such services and quality-of-service (QoS) guarantees as those present nowadays in wired ATM networks. For example, a large number of projects funded under the European Commission's Advanced Communication Technologies and Services (ACTS) programs are focused on research related to third generation mobile communication systems such as the Universal Mobile Telecommunications System (UMTS). Wireless ATM (WATM) can be considered as a very good candidate to implement QoS enabled wireless access networks that would fit well within the UMTS framework. Unlike other wireless LAN proposals, such as the IEEE 802.11, WATM can provide much more elaborate QoS guarantees.

The scarce bandwidth on the air interface, the high bit error rates that can occur on the wireless channel, and the inherent characteristic of the air interface being a broadcast channel, make the design of radio access layer (RAL) design a dramatically important step in WATM networks development. Recently, there has been intensive research on wireless ATM, with a strong emphasis on medium access control protocols (MAC) as well as data link control protocols (DLC). Most industry funded WATM proposals share some common important aspects.

In many of the systems, a WATM network contains one access point (AP) with several wireless terminals (WT). All communications between access point and wireless terminals are done through the multiple access channel. An efficient MAC protocol supports both up link and down link communications by using dynamic time division multiple access (D-TDMA) and time division duplexing (TDD) to provide flexible resources allocation at low cost. The problem with D-TDMA/TDD MAC protocol is that the bandwidth allocation to each user is time varying. Users compete to access the shared medium. Thus, channel management is essential and can be done by the access point. Centralized packet reservation multiple access (C-PRMA) proved to be an efficient means to implement D-TDMA protocol: instead of a fixed allocation of time slots like in second generation mobile networks (GSM), the wireless terminals obtain bandwidth only after requesting it from the AP by either using a random access channel or by piggy-backing their request to a data slot. The data unit of the MAC is a frame. It has one downlink period and one uplink period. During the downlink period the transmission is done only from the AP to the wireless terminals. The AP allocates time slots to connections and announces the allocation in the broadcast field which is part of the down link period. Announcement list and allocation list define the layout of the frame, i.e., in which time slots the terminals are expected to send their cells and in which others should they expect to receive the cells. To reduce further the protocol overhead, slots carrying uplink traffic from the same wireless terminal in a given frame are grouped into a cluster. Physical header and cluster header are appended to the cluster rather than to the individual cells. FIG. 1 shows the structure of this generic MAC frame.

In ATM systems, connections can fall into one of five service classes. They are constant bit-rate (CBR), real-time variable bit-rate (rt-VBR), non-realtime variable bit-rate (nrt-VBR), available bit-rate (ABR) and unspecified bit-rate (UBR). CBR is characterized by the peak cell rate (PCR), maximum tolerable cell transfer delay (maxCTD) and cell loss ratio (CLR). Since for an end-to-end ATM connection the cell delay variation introduced in the wireless part of the connection is expected to be negligible compared to the one introduced in the wired part, we assume that the CDV introduced in the wireless part can be "absorbed" by the AP who performs traffic shaping before forwarding the cells to the wired part of the network. Rt-VBR is characterized by PCR, sustained cell rate (SCR), maxCTD and CLR. nrt-VBR has only PCR, SCR and CLR as parameters. An ABR source is characterized by its minimum cell rate (MCR). UBR does not declare any traffic descriptors and has no quality of service guarantees. In a multi-hop connection like it is the case in wired ATM, the different traffic classes are often segregated in the multiplexers and a static priority among different classes applied. In wireless ATM, especially because of the centralized bandwidth allocation at the AP, as well as the dynamic bandwidth reservation approach, these heterogeneous services can be grouped into two major categories: real time traffics, and non-real time traffics. Real time traffics that include CBR and rt-VBR, require a tight and bounded quality of service with throughput, end-to-end delay, error tolerance. In contrast, non-real time traffics, i.e. nrt-VBR, ABR and UBR, are more elastic with respect to performance guarantees at the ATM layer and below.

Scheduling is a key element when multiplexing different categories of traffic while providing good performance. However, it is not easy to guarantee QoS on a wireless medium for the intrinsic problems of the air interface described previously. Another major consideration, other than the inherent problems of the channel, to take into account for designing scheduling mechanisms in wireless environment is the remote queue problem. The uplink queues in wireless systems are located at the terminals and thus they are regarded as remote queues. The AP has no idea about the queue status unless the wireless terminal exchanges information with it on the issue. How this information is exchanged impacts dramatically the throughput of the MAC as well as the sustained QoS:

(i) to sustain tight QoS bounds, accurate per-cell information, such as cell due date, or virtual times, need to be transferred to the AP;

(ii) by the time the information reaches the AP and is used to estimate the bandwidth to allocate to a given terminal, the queue status might change, and thus the amount of bandwidth allocated to a given wireless terminal does not reflect the queue status at the time immediately before transmission occurs.

This requires a "smart" choice of reservation technique to compromise between protocol throughput and QoS requirements. Smart choice here means exchanging as little information as possible while still providing relatively tight QoS bounds.

The above description leads to the basic criteria for a scheduler for WATM networks. Firstly, the scheduler must be able to serve heterogeneous classes of traffic and make use the available information to perform resources sharing with QoS guarantee; secondly, it has to cooperate with the MAC seamlessly and make use of the MAC effectively; thirdly, any protocol overhead that the scheduler introduces should be as small as possible; finally, the scheduler must cope with the remote queue problem.

SUMMARY OF THE INVENTION

The present distributed scheduling architecture comprises a hierarchy of schedulers comprising one master scheduler and many slave schedulers. The master scheduler is located at the AP. Its basic role is to allocate physical bandwidth to the different terminals. The slave scheduler is located in the data link control layer of a wireless terminal and one is located in the AP. It is important to note that at the AP, both master scheduler and slave scheduler (AP) co-exist while at the wireless terminals only slave schedulers (WT) are implemented. The rationale behind this architecture, is that the AP allocates time slots to the wireless terminals based on the information it receives through the reservation protocol, however, to cope with the problem of this information being out of date, the wireless terminals are allowed to freely distribute the allocated slots among their connections.

BRIEF DESCRIPTION OF THE DRAWINGS

FIGS. 4a through 4d illustrate the deadline curves.

DETAILED DESCRIPTION OF THE INVENTION

Figure 1:
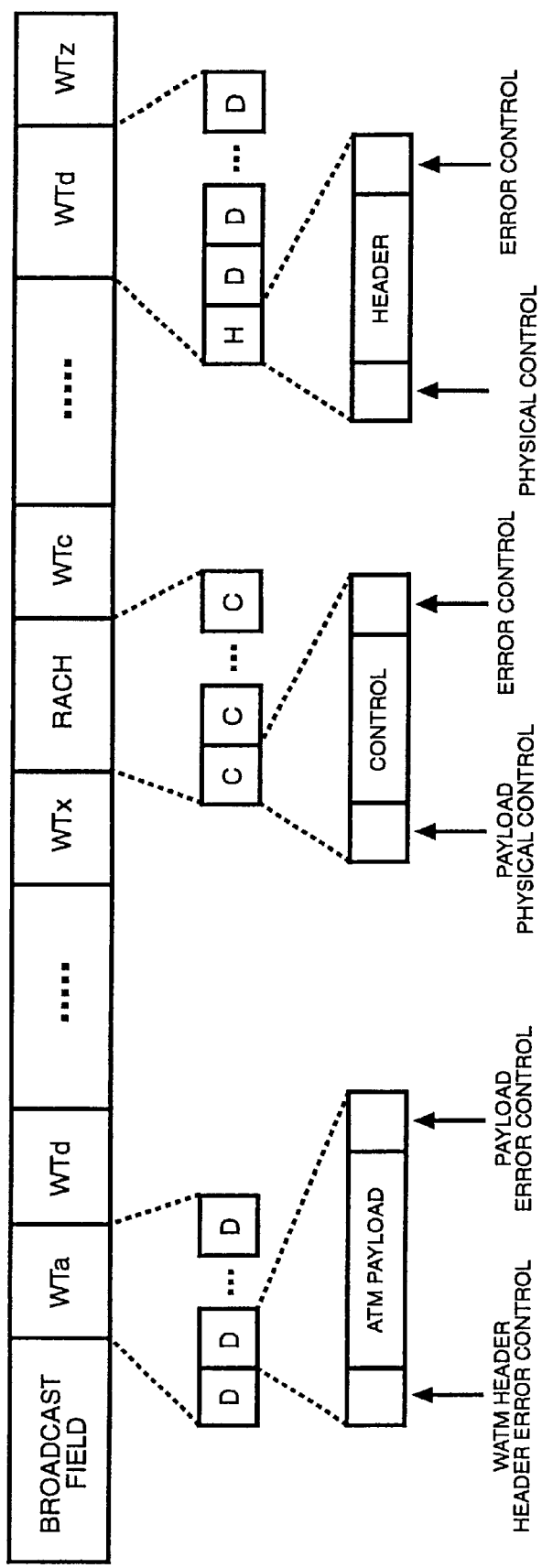
FIG. 1 (Prior Art) illustrates a generic wireless ATM medium access control frame structure.
Figure 2:
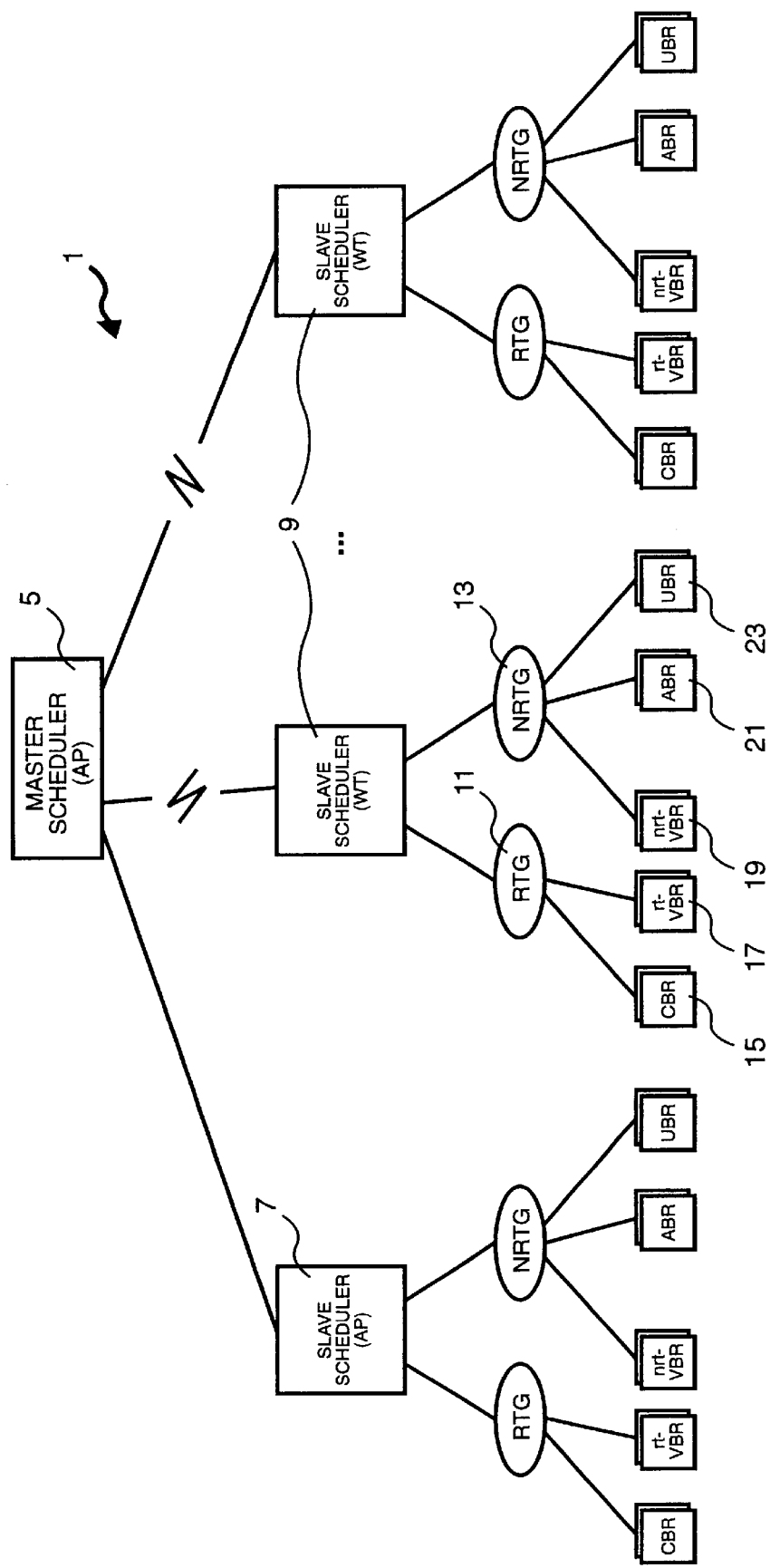
FIG. 2 illustrates the scheduling architecture of the present invention.

The present distributed scheduling architecture 1 is shown in FIG. 2. There is a hierarchy of schedulers comprising one master scheduler 5 and many slave schedulers. The master scheduler is located at the AP. Its basic role is to allocate physical bandwidth to the different terminals. The slave scheduler is located in the data link control layer of a wireless terminal and one is located in the AP. It is important to note that at the AP, both master scheduler 5 and slave scheduler (AP) 7 co-exist while at the wireless terminals only slave schedulers (WT) 9 are implemented. The rationale behind this architecture, is that the AP allocates time slots to the wireless terminals based on the information it receives through the reservation protocol, however, to cope with the problem of this information being out of date, the wireless terminals are allowed to freely distribute the allocated slots among their connections. From hereinafter, unless otherwise stated, "slave schedulers" refers to either AP slave scheduler 7 or WT slave schedulers 9.

Figure 3:
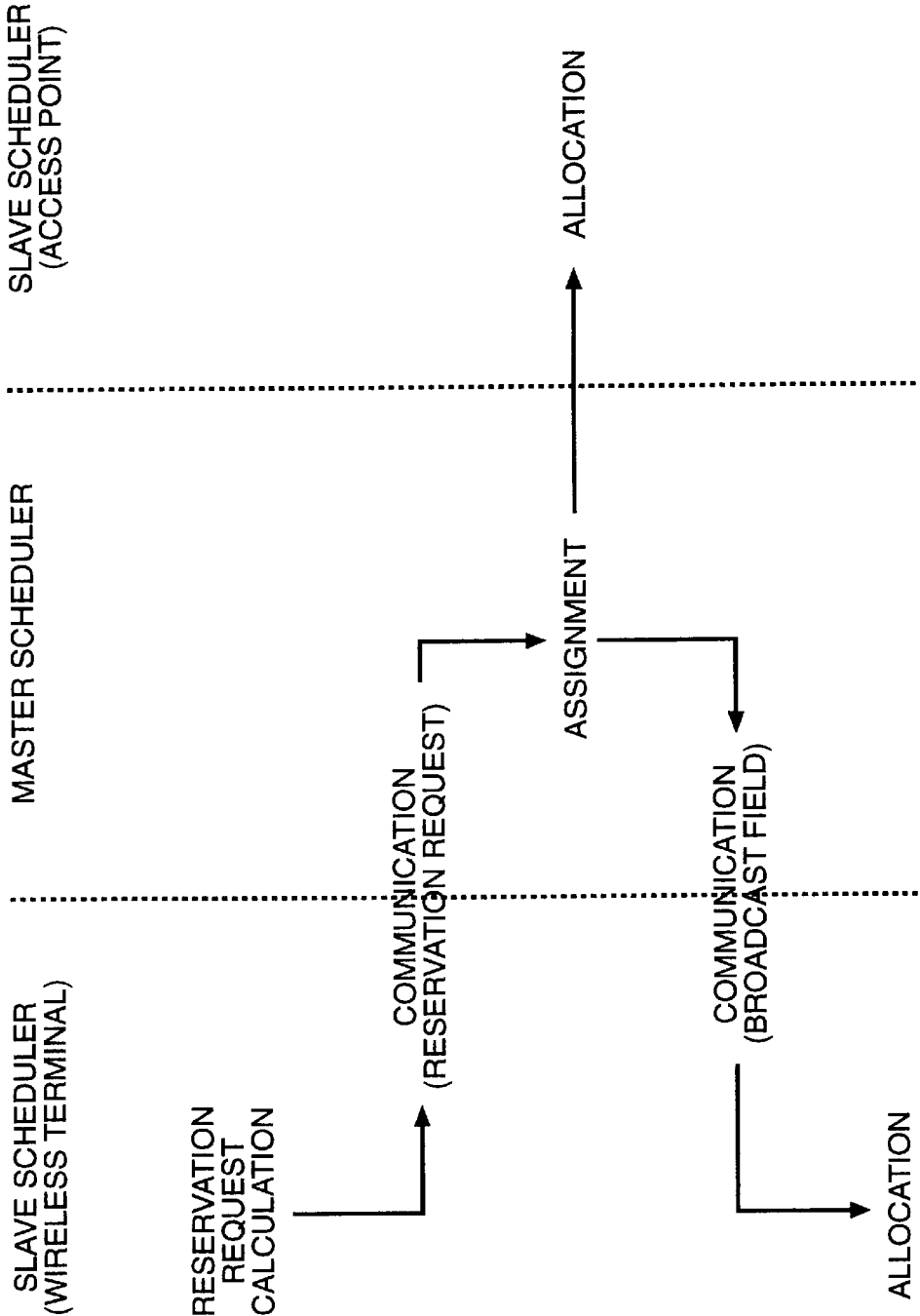
FIG. 3 illustrates the scheduling protocol architecture of the present invention.

In most wireless scheduling architectures proposed in the literature, scheduling occurs in one cycle per frame and finishes before formation of the broadcast field. Wireless terminals transmit then the approved cells by referring to broadcast field. In our approach, the scheduling is performed in two phases as shown in FIG. 3. Phase one is called the assignment period and is done by the master scheduler, i.e. under the access point only. Phase two is called the allocation period and is processed in the slave schedulers, i.e. under both access point and wireless terminals. Both assignment and allocation phases are scheduling processes. Each one has its specialty. The task of a master scheduler is to ration the bandwidth (data slots) to slave schedulers. A slave scheduler selects the appropriate cells from its queues and assigns them the data slots obtained from the master scheduler. As stated before, slave scheduler knows better of the up-to-date queuing status. Thus, if it is permitted to decide the sequence of cell transmissions instead of following instructions from master scheduler (this approach is usually used in MAC schedulers in the literature), it would allow better guarantees of the QoS bounds. And this addresses efficiently the issue stated above (labeled (ii)) arising from the remote queue problem.

Now in regard to the problem of reservation overhead arising from the remote queue problem and labeled (i) above, two things affect the performance of a reservation protocol. One is the collision resolution algorithm which has been addressed extensively in the literature. Another one, which had been much less addressed, is the size of the information carried in the reservation protocol and the information itself. A consequence of the distributed architecture presented above is that the master scheduler does not require detailed status of the remote queues to allocate time slots. The fewer information the master scheduler needs to know, the smaller the size of the overhead generated by the reservation. Grouping the connections as trunks and making reservation per-trunk can reduce the overhead effectively with respect to the alterative of making reservation per-connection. In WATM, the five traffic classes have different traffic characteristics and QoS requirements. Hence the present invention only group those connections which share similar parameters and segregate those who differ dramatically, and hence, the present architecture separates the connections into a realtime group (RTG) 11 and non-realtime group (NRTG) 13 as shown in FIG. 2. This grouping separates CBR 15 and rt-VBR 17 from nrt-VBR 19, ABR 21 and UBR 23. CBR and rt-VBR are grouped into the real time group 11 since they have predefined bandwidth, delay and cell loss requirements. The nrt-VBR, ABR and UBR are merged into the non-real time group 13 as bandwidth and delay requirement are not clearly specified and this group can sustain typically longer delay and delay variation.

The QoS targets and service discipline of the two different groups are different. For example the slave scheduler needs to report the due dates of the cells to the master scheduler in order to obtain tight guarantees for the real time group, while it needs to report the rate guarantee for the non real time group. Reporting the priorities (due date or guarantee level) per-cell is obviously extremely inefficient as this would increase drastically the protocol overhead. To solve this problem, the present scheduler architecture utilizes deadline curves. A deadline curve is a function that gives the time by which each of the real-time cells would expire and thus do not need to be sent anymore. Examples of deadline curves are shown in FIG. 4(a) and FIG. 4(b) for VBR and CBR traffics respectively. Each bullet 25 on the graph represents an ATM cell. The ordinates 27 correspond to the order of (expiry) of the cell, while the corresponding abscissa 29 represents the deadline of the cell. For instance, in an ideal CBR stream FIG. 4(b), cell dexpires maxCTD after cell c which in turns expires maxCTD after cell b, etc, with maxCTD being the negotiated maximum cell transfer delay. Each real-time connection can be characterized by its deadline curve. The deadline curve of the real time group can be obtained easily by merging the individual deadline curves and reordering the cells.

FIG. 4(c) shows the deadline curve for the traffic mix of the CBR and the VBR traffics whose deadline curves are described in FIG. 4(a) and FIG. 4(b). The target is to send the real time group deadline curve from a slave scheduler to the master scheduler while using as little bandwidth as possible. Compression reduces the overhead but loses information. The basic idea is to approximate the curve by several linear segments. More segments result in higher fidelity. Less segments would result in a coarse approximation. The present invention uses a fixed number of segments and timing parameters to minimize the information that needs to be exchanged. Although this number can be varied, the preferred embodiment fixes to 3. The real-time group reservation can thus be represented by three numbers which give the number of cells within each segment. When the reservation is received, the master scheduler decompresses the curve information and creates a virtual queue, i.e. a list of due dates.

FIG. 4(d) shows the real time group service curve that has two real time connections and the deviation of the compressed/decompressed curve from the original curve. With this approach, the real time cells can be classified into three subgroups: urgent cells; less urgent cells; and non urgent cells. The first subgroup corresponds to the cells whose deadline is smaller or equal than the first breakpoint on the curve, the second subgroup comprises the cells whose deadline is larger than the first breakpoint but smaller than the second breakpoint, and finally the third subgroup is composed of cells whose deadline is larger than the second breakpoint. The compression of the reservation request consists in sending 3 numbers corresponding to the number of cells within each subgroup.

The static priority (CBR>rt-VBR>nrt-VBR>ABR>UBR) between ATM service categories is a common practice in WATM proposed architectures. This will lead to some very odd results in certain occasion. For instance, suppose a terminal has one CBR with delay tolerance 500 ms and one VBR connection with delay tolerance 100 ms. Wireless terminal will observe CBR suffer shorter end to end delay than VBR although it can tolerance five times as much as VBR can. In particular, due to the static priority, the higher the priority of the service category the more the QoS of the class is over-guaranteed. In other words, static priority offers an unnecessarily better performance to the real time traffic while the non real time traffic which although is a best-effort service would suffer longer delays: ironically, this has nothing to deserve the qualification of "best-effort". The urgency of the cells should be the only factor that determines the precedence between cells of different service categories. Due dates measure the urgency of real time cells and guaranteed bit rate indicates the urgency of non-real time cells. The new priority between service classes is shown in Table A.

TABLE A

| Dynamic Priority Classes | |
|---|---|
| Highest Priority | Urgent Realtime Cells |
| High Priority | High priority non-realtime cell |
| Lowest Priority | The rest of the cells |
| | (non-urgent realtime cells and low priority |
| | non-realtime cells non-urgent realtime cells) |

Urgent real time cells are served according to the EDD (Earliest Due Data) discipline. Fair queuing breaks the ties between cells of the high priority non-real time subgroup. The rest of the cells are served according to a round robin algorithm. Intuitively, this new reclassification of the ATM service categories into the three MAC layer categories states that: urgent (time-based) cells are allocated bandwidth first, otherwise (if they are not urgent) they can wait; urgent (rate-based) cells are allocated bandwidth next, otherwise they can wait; if there is bandwidth left all the non-urgent cells are served last in a round-robin fashion should they belong to the real-time class, the non real-time class or the rest. With this approach, we ensure that real-time traffic is not over-guaranteed and thus we can make use of the freed bandwidth to ensure a "better" best-effort service for the non-real time traffic.

Now we describe how to map the QoS parameters of an ATM source into the urgency parameters of the MAC layer. The difference between urgent real time cells and non-urgent real time cells lies in the remaining time they are allowed to wait. A cell with remaining time less than a defined threshold is classified into the urgent real time group. The threshold is called the length of the urgency period. For example, every real time cell is allowed to wait up to maxCTD before being useless for the application. If we denote the urgency period Urg, then a cell that arrives at time instant t, first joins the real time non-urgent group. It is upgraded to the urgent real time group at time instant t+maxCTD-Urg (See Appendix B for algorithms).

For nrt-VBR and ABR, bandwidth is guaranteed in long term. The ATM traffic descriptors for such a bandwidth is the sustained cell rate (SCR) for nrt-VBR and the minimum cell rate (MCR) for ABR. Thus it is better to serve all the non-real time connection with the promised service before providing extra bandwidth to some of them. High priority non-real time cells refer to cells which should be served first to guarantee the long term service while low priority non-real time cells refer to cells which can wait without affecting the guaranteed bandwidth. In practice, a cell is accorded low priority when it arrives. It is promoted from low priority to high priority if the last promotion has been done more than 1/R units of time earlier, where R represents the SCR (respectively MCR) for the nrt-VBR (respectively ABR) service category. Note that not all non-real-time cells will be upgraded-only a faction of the non-real-time traffic is upgraded. UBR has no delay or bandwidth requirement and therefore it is always accorded low priority without promotions. The reservation request for the non-real-time group consists of sending two numbers which represent the size in cells of the high priority non-real-time group and the low priority non-real-time group respectively.

Under this dynamic priority scheme, non-real time connections may receive a shorter mean delay than the real time connections as long as the QoS of the real time connections is not violated. This occurs when the delay tolerance of a real time connection is larger than the length of the urgency period. Non-real time connections are then served even when the real time queues are not empty. It is expected that the mean delay of a real time connection increases proportionally to its delay tolerance. This scheme is acceptable and sometimes may be necessary because in general, real time application usually set play back delay to be the same as the maximum delay tolerance. Moreover, playback buffers are in general dimensioned with this delay tolerance in the picture. So delivering cells much earlier than they are due might result in cells being lost because of playback buffer overflow. In contrast, non real time applications (e.g., web browsing) make use of cells immediately after their arrival. Shorter mean delay has much more meaning to these applications.

The master scheduler and the slave scheduler are independent and have similar routines. There are slight differences between the two because the master scheduler schedules groups while slave scheduler schedules connections. Yet, the scheduling priority should remain unchanged to avoid any conflict between the two schedulers and preserve a coherent scheduling system. Master scheduler starts the slots assignment process at the end of the frame and after it finishes it will be idle until the end of the next frame. Slave schedulers start just before the beginning of the first slot they are allocated and goes on until all the slots it is allocated are exhausted. Therefore, the master scheduler runs for exactly one cycle per frame time while a slave scheduler may run as many cycles in one frame time as the number of slots it is allocated. This distributes the processing overhead between the wireless terminals and the AP. The pseudo-code for the different scheduling processes are given in the annex. They are presented as an illustration only and should not be construed as being the only way the scheduling processes are implemented.

Figure 5:
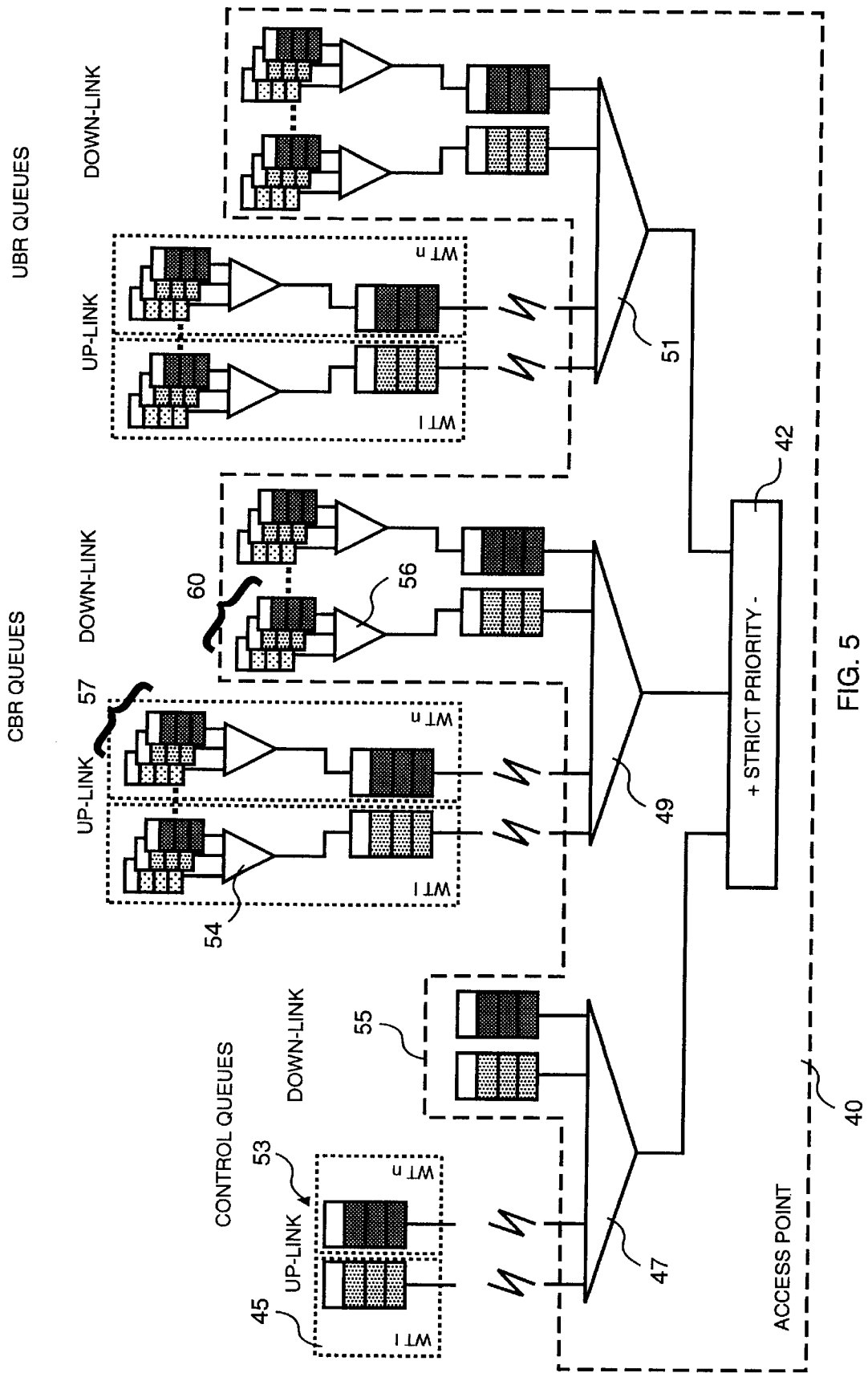
FIG. 5 illustrates the scheduling architecture of another embodiment of the present invention.

The present distributed architecture is flexible in that it may be customized for individual occasions. FIG. 5 illustrates an alternative embodiment where the present scheduler is adapted to be used in an ATM network having only two types of services. For illustration, the two types of services here will be CBR and UBR services. FIG. 5 shows the basic architecture of this embodiment. FIG. 5 illustrates the AP 40 and a plurality of wireless terminals 45 denoted as WT1 through WTn, which are wirelessly linked to the AP 40. The AP provides three separate channels corresponding to control support 47 and each type of service, the CBR service 49, and UBR service 51. The scheduling of these channels of traffic is done by the master scheduler 42, which in this case, is done on a strict priority basis, i.e. highest priority is given to the control queues, then to CBR, and then to UBR. Each of the channels serves both the up-link, e.g. 53, and down-link, e.g. 55, traffic. Consistent with the general distributed architecture shown in FIG. 2, each WT 45 has a slave scheduler 54 corresponding to each set of connections, e.g. CBR connections 57, for the up-link traffic. Similarly, the AP also has a slave scheduler 56 corresponding to each set of connections 60 for the down-link traffic.

In this scheduling architecture, the decision remains centralized to the AP. Nevertheless, to allow high flexibility and distribute the processing overhead among the WTs and the AP, the scheduling algorithm is distributed among the WTs and the AP. The AP schedules the slots on per-service basis while the WT schedules (shares) the outcome among the different connections of a given service, e.g. CBR connections 57.

Figure 6:
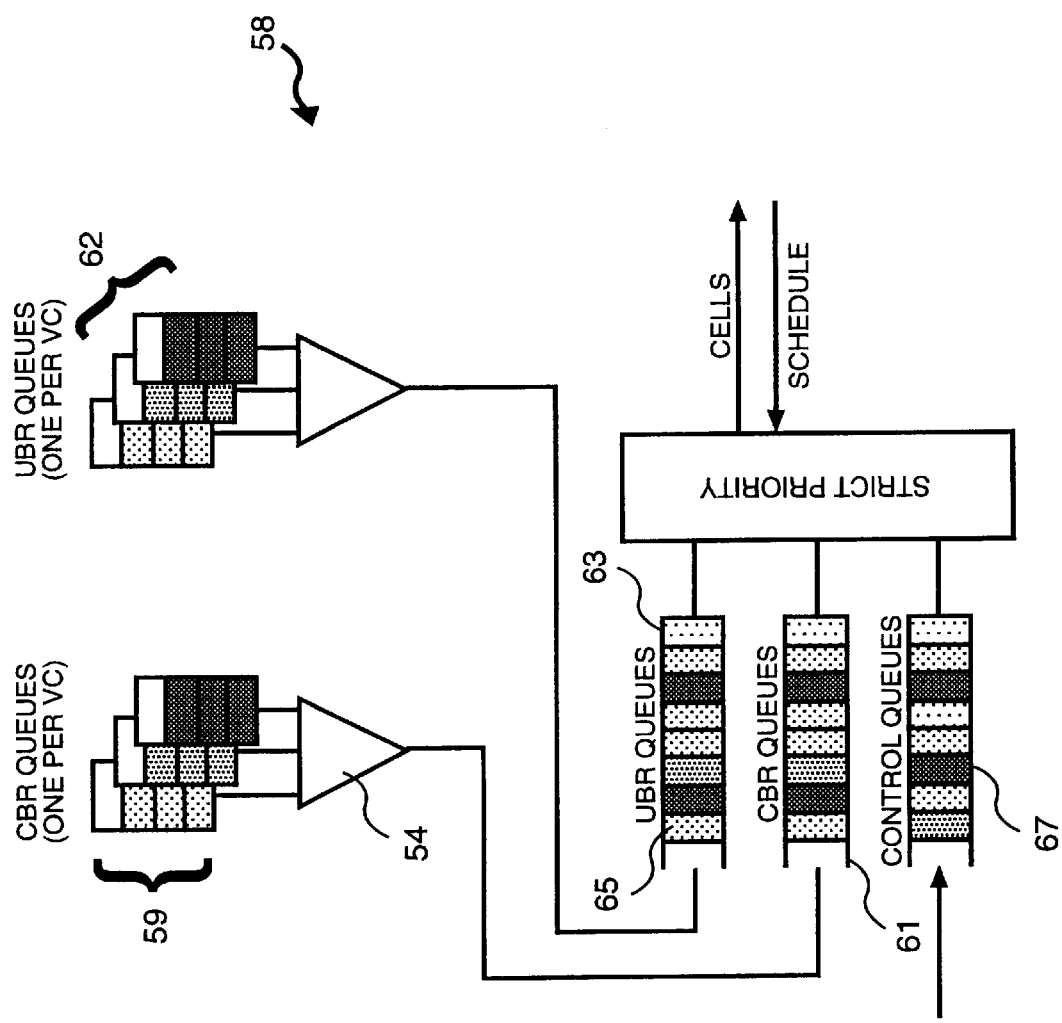
FIG. 6 illustrates the scheduling architecture of the wireless terminal (WT) sub-system of the embodiment shown in FIG. 5.

As shown in FIG. 6, in the WT sub-system 58, each of the CBR virtual channels (VC) 59 and UBR channels 62 is assigned an individual queue. Whenever a cell is generated by the ATM layer, it must pass through the usage parameter control (UPC) function, where its conformance to the QoS contract is ascertained. The UPC function is not mandatory for CBR connections as the scheduling algorithm described later is inspired to some extent from the generic cell rate algorithm (GCRA) which is the standard UPC algorithm specified by the ATM forum. If the cell conforms to the traffic contract, it is appended to the end of the queue corresponding to its virtual channel identifier (VCI). In addition, to the VC queues, each service (CBR and UBR) is assigned a dedicated service queue (CBR 61, UBR 63), in which schedules are constructed independently of the scheduling at the AP. The cells 65 arriving to the individual queues, 59 and 62, are inserted in the service queues 61, 63 according to the precedence defined by the fairness criteria and the scheduling algorithm related to either service (CBR or UBR).

The WT sub-system role is to interleave the cells from the different VCs 59, 62, into the corresponding service queues 61, 63. The cells in the service queues 61, 63 are then transmitted to the AP on a strict priority basis, that is, the cells from the CBR service queue 61 are sent first, and the cells from the UBR service queue 63 are sent only when no other cells from the CBR queue 61 are left. The cells in the service queues are sent as follows: The WT sends, either in the RACH or by piggy-backing, a reservation request containing the number of cells wafting in each of its service queues, and the AP replies in the following frame with the number and location of time slots that the WT is allowed to use in the subsequent frame.

Note that it is not mandatory that the service queues contain the actual cells 35. In the implementation, these queues may only contain an ordered list of VCIs referring to the individual VC queues. In addition, although we addressed here only the up-link channel, as it is more challenging from the point of view of scheduling, due to the fact that the service queues are remotely located from the AP scheduler, in the actual system, the scheduling architecture can be symmetric. More specifically, each downlink VC is allocated one individual queue at the AP, and the VCs corresponding to a given service class and a given terminal are scheduled into the same service queue.

To ensure high bandwidth utilization, the schedule broadcast in a given frame, say $C_1$, concerns only cells that arrived in the previous frame/frames. Accordingly, for the CBR service, the WT sub-system 58 interleaves the cells from different VCs 59, 62 into the service queue 61, 63 according to their arrival time provided that they pass through the GCRA based scheduling algorithm. At the end of a given frame duration, the CBR service queue 61 contains only the cells that arrived during this frame and are accepted by the GCRA. Denote by $c^i_j$ the reference to arrival time of cell i of VC j, i.e. the time by which an arriving cell can be considered in conformance to the traffic contract. Let $a^j_i$ be the actual arrival time of cell i of stream j. Let $a^j_o$ be the arrival time of the first cell of VC j. The conformance test algorithm for a given CBR VC 59 gives:

$$\begin{cases} c_o^j = a_o^j \\ c_{k+1}^j = c_k^j + T_i, \text{ if } c_k^j > a_k^j \\ c_{k+1}^j = a_k^j + T_i, \text{ if } c_k^j \le a_k^j \end{cases} \quad (1)$$

The algorithm above ensures that if any cell i arriving to its VC queue at date $a_j^i$ is inserted in the service queue at date $c_j^i$ all the cells in the service queue conform to the traffic contract and thus can access the transmission link as soon as the time slots are assigned by the AP scheduler. The preferred embodiment of the scheduling algorithm for the CBR service in the WT sub-system 58 is as shown in Table 1. Of course, it should be appreciated by those skilled in the art that other algorithms employing the principles of the scheduling algorithm of Table 1 are clearly possible. The notations for Table 1 is as follows:

$c^i$: reference arrival time of the next cell of VCI i;

$Q^i$: queue length of VCI i;

NS: number of slots in the next frame;

$T_i$: inverse of the peak rate of VCI i;

$t_f$: the time current frame ends;

$a_o^j$: arrival time of the first cell of VCI i.

TABLE 1

INITIALIZATION (to be executed on Call Admission Control for a new C B R connection i)
    PASSIVE_SET ← PASSIVE SET ∪{i};
END
PASSIVE_SET MONITORING PROCESS
BEGIN
  WHILE NonEmpty (Events_Queue) Do
    GetNextEvent(theEvent);
    i ← theEvent. VCI;
    Q[i] ← Q[i] + 1;
    c[i] ← max {c[i],theEvent.date};
    Insert c[i] in the list c[i$_1$] ≤ c[i$_2$] ≤ ... ≤ c[i$_n$]
    IF Q[i] == 1 THEN ACTIVE_SET ← ACTIVE_SET ∪{i};
        PASSIVE_SET ← PASSIVE SET\ {i};
    END IF
  END WHILE
END
CHORE PROCESS (daemon)
BEGIN (schedule for frame f + 1)
  WHILE (true) DO
    MONITOR_PASSIVE_SET( );
    IF NonEmpty(ACTIVE_SET) AND (c[i$_1$] < t$_f$) AND (NS>0)
      CBR_QUEUE.ENQUEUE(VCI i$_1$);
      NS ← NS - 1;
      Q[i] ← Q[i] - 1;
      IF Q[i]==1 THEN ACTIVE_SET ← ACTIVE_SET \{i$_1$};
        PASSIVE_SET ← PASSIVE_SET ∪{i$_1$};
      END IF
    END IF
  ENDWHILE
END
SOFTWARE INTERRUPT (triggered by a cell arrival)
BEGIN
  theEvent.VCI ← cell.Header.VCI;
  theEvent.date ← currentTime;
  EnqueueEvent(theEvent);
END The UBR cells are inserted into the corresponding service queue 63 according to a "virtual" departure time, which determines how the cells should be transmitted but not when. The goal of this scheduling of the UBR VCs 62 is to guarantee a certain fairness criterion. As defined by the ATM forum, UBR is a service without guarantee. In other words, any service policy would be fair with respect to the traffic contract. Nevertheless, for the network to provide a best effort service, either the delay should be "fairly experienced" or the bandwidth "fairly shared". This kind of fairness can be achieved by applying a variant of the so-called self-clocked fair queuing algorithm. In this algorithm, the arriving packets are time-stamped according to an increasing virtual clock, with a virtual finish time. The virtual finish time for a given cell is function of, among others, the fair share which determines the proportion of resources guaranteed to the corresponding VC. In our particular case, there is no specific guarantee in the traffic contract for UBR. We can thus define the share according to the fairness we wish to implement:

1. to guarantee the delay is equally shared among the UBR VCs 62, the fair share of a given VC should be chosen to be proportional to the VC's queue length, so that VCs with long queue will receive more bandwidth;

2. to guarantee the fairness in the sense of bandwidth, the fair shares of all the VCs should be the same. One possible way of implementing this approach can be by simply using the so-called round-robin service policy Moreover, in our architecture, each VC has a dedicated queue, making it thus possible to actually postpone the computation of the time-stamp of a given cell until it reaches the head of its queue. According to this, the time-stamp of the ith cell of VCj is computed as follows:

$$T_i^j = \frac{1}{S_j} + v(a_i^j);$$

where $S_j$ is the fair share for VC j, and $v(a_i^j)$ is the virtual clock at the time $a_i^j$ when the ith cell reaches the head of its queue j. The virtual clock in the SCFQ algorithm is taken as the time-stamp of the packet being served. Accordingly, the scheduling algorithm for the UBR VCs 62 would be as given in Tables 2, 3, and 4. The notations for the Tables 2, 3, and 4 are as follows:

$S_i$: service share of VCI i;

B: UBR service buffer size;

$T_i$: time-stamp of the HOL cell VC i;

v: virtual clock of the system;

$Q_i$: queue length of VC i.

TABLE 2

BEGIN CHORE PROCESS
  WHILE B > 0 DO
    Check for any newly active VC i and calculate their HOL
    time-tag T$_i$ = 1/S$_i$ + v.
    Sort the active streams: T$_{i_1}$ ≤ T$_{i_2}$ ≤ ... ≤ T$_{i_j}$
    WHILE  T$_{i_1}$ ≤ T$_{i_2}$ DO
      UBR_QUEUE.ENQUEUE(VCI i$_1$);
      Q$_{i_1}$ ← Q$_{i_1}$ - 1;
      B ← B - 1;
      IF B == 0 THEN EXIT;
      IF Q$_{i_1}$ > 0
      THEN T$_{i_1}$ = 1/S$_{i_1}$ +T$_{i_1}$
        Sort the active VCs: T$_{i_1}$ ≤ T$_{i_2}$ ≤ ... ≤ T$_{i_j}$
      ELSE
        Expel VC i$_1$ from the list of active streams.
      ENDIF
    DONE
  DONE
  v ← T$_{i_1}$
END CHORE PROCESS

TABLE 3

BEGIN ARRIVALS PROCESS
    IF New UBR cell for VCI i THEN $Q_i \leftarrow Q_i + 1$
    ENDIF
END ARRIVALS PROCESS

TABLE 4

BEGIN ARRIVALS PROCESS
    IF UBR cell transmitted THEN $B \leftarrow B + 1$
    ENDIF
END ARRIVALS PROCESS Sporadically, control messages need to be exchanged between the WTs and the AP. Because of the bandwidth scarcity, on one hand and the rare occurrence of such control packets on the other hand, it is more efficient to allocate the bandwidth to these messages on demand rather than by reserving a CBR channel that might seldom be used. Each WT comprises an additional first-in-first-out (FIFO) queue 67 where the control messages are appended in the order of their arrival. The WT obtains bandwidth for the control queue by issuing a reservation as done for the UBR service. However, at the central scheduler (AP) the control queue 67 has precedence over all other services.

In another embodiment of the present invention, to prevent control messages from monopolizing the bandwidth, different sets and priorities of control messages can be defined. Depending on the purpose of the control messages and their urgency or category, they can either be treated at the same level as the UBR service when they are non-urgent messages or with possible preemption right over other services such as CBR, when they belong to the urgent control messages class. In other words, if these messages cannot suffer any access delay, a system where control messages "steal" bandwidth from CBR and UBR connections can be implemented by giving urgent control messages higher priority than other control messages and service classes.

Figure 7:
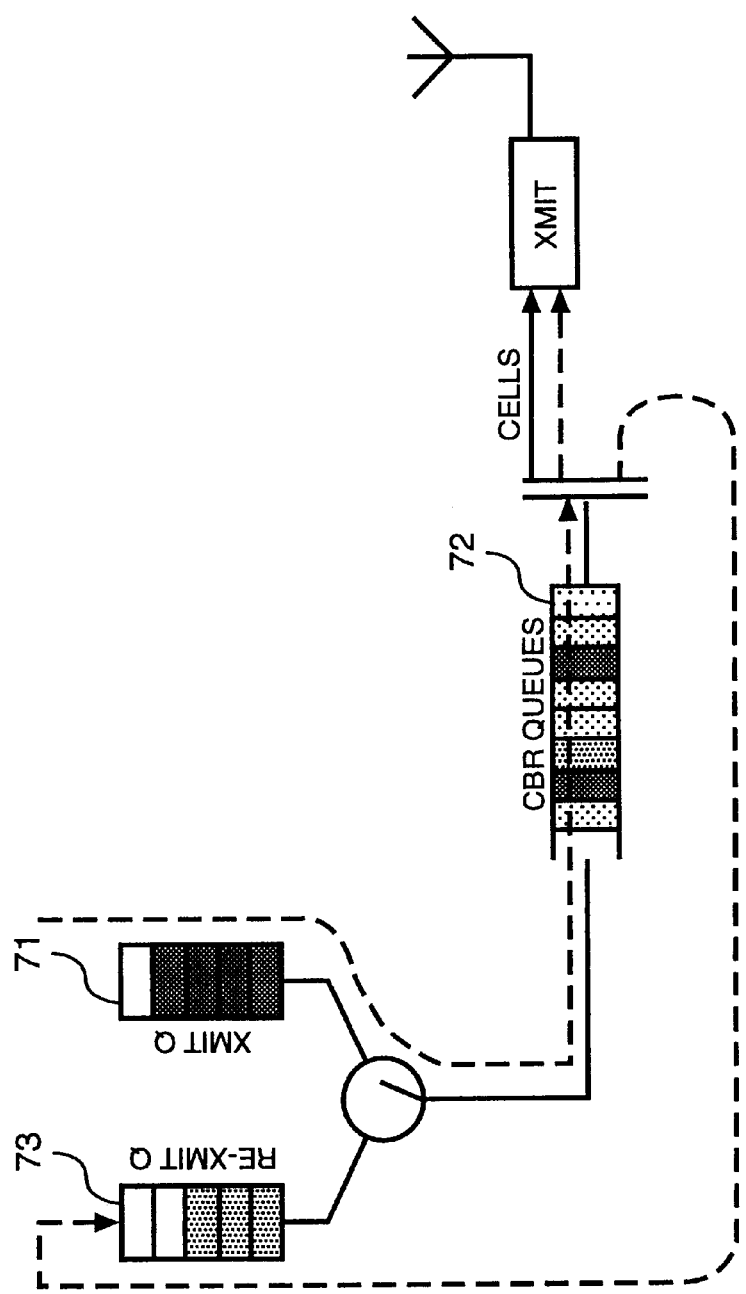
FIG. 7 illustrates the architecture for retransmission support for the embodiment shown in FIG. 5.

As the wireless channel may introduce errors at higher rates than the QoS targets, it may be necessary to implement retransmission schemes to ensure that the cells reach the ATM layer of the AP error-free. The present system employing a re-transmission scheme is depicted in FIG. 7. Referring to FIG. 7, each VC queue 71 is associated with a corresponding re-transmission queue 73. Each of these two queues is served on a first come first served basis (FCFS). The service alternates between these two queues as follows. When a cell from a given VC 71 is sent to the service queue 72 and actually transmitted, it is copied from its transmission queue 71 to the re-transmission buffer 73. Upon reception of a negative acknowledgment (NACK), or when a timeout expires, in case of go-back-N all the cells preceding the NACKed cell are discarded (i.e. assumed to be received without errors). The service switches then automatically from the transmit queue 71 to the re-transmit queue 73. The retransmissions are carried out until the re-transmission queue is empty or, in the case of CBR, until the deadline for the cells under consideration expires, in which case the cells are discarded or alternatively handed over with errors. When the re-transmission queue is empty, the system switches back to the transmission queue 71 automatically. Upon reception of a positive ACK, the cells, up-to the one corresponding to the retransmission sequence number, are discarded from the re-transmission buffer 73. In other words they are already received without errors.

Figure 8:
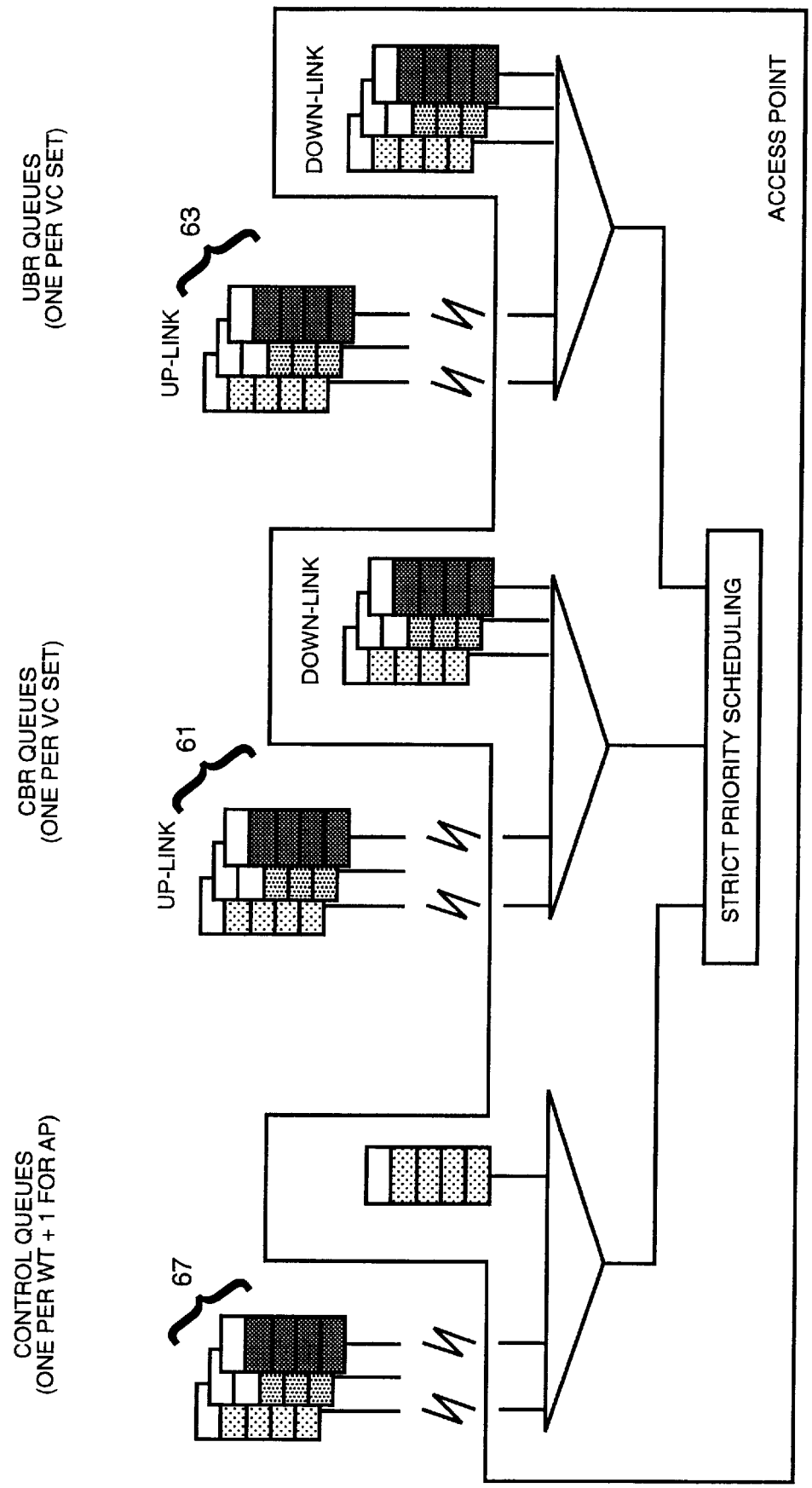
FIG. 8 illustrates the scheduling architecture at the access point (AP) for the embodiment shown in FIG. 5.
Figure 9:
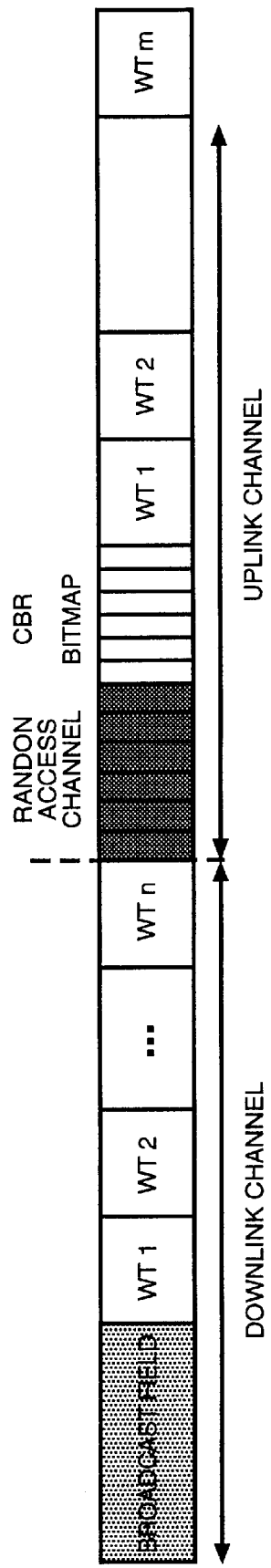
FIG. 9 illustrates the general structure of the medium access control frame of an embodiment of the present invention.

The structure of the AP scheduling sub-system is shown in FIG. 8. Each class of traffic either up-link or down-link is associated with a dedicated queue for each wireless terminal (WT). The up-link queues, 61, 63, 67 are virtual as these are actually located at the wireless terminals. At the AP, these queues are represented by either the most recently received corresponding queue length for the reservation based services such as res-CBR (we use the acronym res-CBR to refer to the CBR streams that obtain bandwidth by reservation) or UBR; or by a predicted number of cell arrivals for the CBR service.

Like the WT scheduling sub-system, the scheduling algorithm at the AP segregates the traffic classes, CBR and UBR, with respect to the tightness of their QoS requirements. Delay sensitive traffic should naturally be served before any delay non-sensitive traffic. Across classes, the priority is static. In other words, control messages are sent first, then CBR service cells and finally the UBR connections are served if any time slots are left.

As discussed previously, in another embodiment of the present invention, to prevent control messages from monopolizing the bandwidth, different sets and priorities of control messages can be defined. Depending on the purpose of the control messages and their urgency or category, they can either be treated at the same level as the UBR service when they are non-urgent messages or with possible preemption right over other services such as CBR, when they belong to the urgent control messages class. In other words, if these messages cannot suffer any access delay, a system where some control messages are served before CBR and UBR connections can be implemented by giving urgent control messages higher priority that other control messages and service classes. Finally, the up-link traffic and the down-link traffic classes are assumed to have similar priorities. The only segregation between the up-link and down-link traffic, for a given traffic class should be due to a fair scheduling algorithm.

The problem that arises when scheduling CBR connections at the AP is the lack of information, especially for the up-link channel regarding the arrival time of the different cells. Unlike the other types of connections, to obtain bandwidth, a CBR connection does not require a reservation. In this case the AP must rely on predicting the arrival times of the CBR cells in order to allocate the appropriate number of slots in the next frame. On the other hand, due to the scarcity of the bandwidth on the air interface, and knowing that although the service is CBR the traffic might not be CBR, an allocation based on prediction can result in low bandwidth utilization. A CBR service where the bandwidth is allocated based on reservation can also be adopted.

The probabilistic approach relies on the probabilistic prediction of the number of cell arrivals (to the data link control layer) at a given WT during a given frame. In other words, if we can derive the distribution of the number of arrivals in a given interval of time, then we can predict from the quantiles of this distribution to any given confidence threshold the number of arrivals in each frame provided its duration. To allocate the required time slots to the corresponding WT, the AP would use this number. Note that although this approach may result in an over-allocation of the bandwidth, its attractive feature resides in its very low complexity and a probabilistic guarantee of channel access delay bounds smaller than one frame.

The reservation-based approach can be designed according to three different methods depending on the way the reservations are made.

i) The first method is to let CBR connections compete with the UBR connections for the same slots in the random access channel (RACH) and in the piggy-back fields of the MAC data units. Whether this solution is more efficient than the probabilistic approach or not, is not obvious since both approaches waste bandwidth by either over-allocation or contention.

ii) A second approach which seems more efficient is to assign temporary RACH slots to a given CBR stream whenever a cell is predicted to arrive. For example, let $T_i$ be the inverse of the peak rate of a given CBR stream i. Assume at time $t_1$, the AP received the last cell from stream i. Since the service is CBR, the AP is not required to allocate any slot to stream i before time $t_1+T_i$. Nevertheless, connection i might not produce a perfect CBR traffic (due to packetization delay etc.), allocating a data slot would thus result in a substantial bandwidth waste of one data slot per CBR connection predicted to produce cells. Instead, the AP can scan the schedule for the next frame (ready to broadcast) and decide to reserves a RACH slot(s) for that particular WT, if the WT does not have any cell to piggy-back its request to. This approach would reduce the bandwidth waste encountered in the previous modes by at least 1:6 ratio. It also reduces the contention probability for the CBR service as the CBR RACH slots are reserved and are not subject to contention.

iii) The third approach that can be adopted is to allocate a static separate reservation channel for CBR connections (CBR-Bitmap). As the bit rate for CBR is predefined, it is sufficient for the AP to know whether a connection has data or not, without details on how much data the connection has. In this case, it is sufficient to assign statically (or even dynamically, depending on the tolerated system complexity) one bit to every CBR connection at the connection setup. The MAC frame structure would be as in FIG. 5. A connection that has a cell ready to transmit, sets its corresponding bit, in the CBR-Bitmap. By scanning this bit, the AP schedules one slot for the corresponding terminal in the subsequent frame/frames. For the UBR service, the same algorithm as for the WT sub-system can be used. However, now the scheduler allocates time slots instead of positions in the buffer. Besides it allocates the time slots to the service queues (or bundles of VCs) instead of to one VC at a time. Accordingly, for the UBR service, now the fair service share might again be chosen as either the WT's UBR service queue length or alternatively an equal share can be allocated to all the UBR service queues. Using the following notations, the algorithm is given in Table 5. The notations for Table 5 are as follows:

$S_i$: service share of VP (wireless terminal) i;
NS: number of slots remaining unallocated after serving the CBR;
$T_i$: time-stamp of the HOL cell of VP (wireless terminal) i;
v: virtual clock of the system;
Q: queue length of VP (UBR queue for wireless terminal) i.

The present invention may be embodied in other specific forms without departing from the spirit or essential characteristics thereof. The presently disclosed embodiments are, therefore, to be considered in all respects as illustrative and not restrictive, the scope of the invention being indicated by the appended claims and all changes which come within the meaning and range of equivalency of the claims are, therefore, to be embraced therein.

TABLE 5

BEGIN CHORE PROCESS
  WHILE NS > 0 DO
    Check for any newly received bandwidth reservation from
    terminal i and calculate its HOL time-tag $T_i = 1/S_i + v$.
    Sort the active streams: $T_{i_1} \leq T_{i_2} \leq \ldots \leq T_{i_j}$
    WHILE $T_{i_1} \leq T_{i_2}$ DO
      ALLOCATE_SLOT (WT $i_1$);
      $Q_{i_1} \leftarrow Q_{i_1} - 1$;
      NS ← NS − 1;
      IF NS == 0 THEN EXIT;
      IF $Q_{i_1} > 0$
      THEN
        $T_{i_1} = 1/S_{i_1} + T_{i_1}$
        Sort the active VPs: $T_{i_1} \leq T_{i_2} \leq \ldots \leq T_{i_j}$
      ELSE
        Expel VP $i_1$ from the list of active streams.
      ENDIF
    DONE
  DONE
  v ← $T_{i_1}$
END CHORE PROCESS APPENDIX A: Notations

| | |
|---|---|
| $C_i$: | set of connection in slave scheduler i; |
| $Q_m^U$: | queue of urgent real time connection m; |
| $Q_m^H$: | queue of high priority non-real time connection m; |
| $Q_m^R$: | queue of non-urgent real time connection and low priority non-real time connection m; |
| $C_m$: | credit for $Q_m^H$ |
| N: | set of slave schedulers; |
| $Q_i^{UG}$: | queue of urgent real time group for slave scheduler i; |
| $Q_i^{HG}$: | queue of high priority non-real time group for slave scheduler i; |
| $Q_i^{RG}$: | queue of low priority non-urgent real time group and non real time group for slave scheduler i; |
| $c_i$: | credit for $Q_i^{HG}$; |
| $a_i$: | number of slots that will be assigned to slave scheduler i in the next frame; |
| s: | slots left in the next frame to be scheduled; |
| last: | index of the last queue served in the low priority group; |
| SIZE(Q): | size of queue Q; |
| DEADLINE(Q): | returns the deadline of HOL packet of queue Q; |
| DEQUEUE(Q): | removes the HOL from the queue Q; |
| NEXT_INDEX(index): | returns the successor of index; |
| $Q_m^{R+}$: | queue of non-urgent real time connection; |
| $Q_m^{R-}$: | queue of low priority non-real time connection; |
| $r_m$: | guaranteed cell rate of connection m (either the sustained cell rate or the minimum cell rate for VBR and ABR respectively); |
| SLEEP(t,FUNCTION()): | executes FUNCTION() at time t. |

APPENDIX B: Pseudo-code

Algorithm 1: Master Scheduling Algorithm
\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*
procedure MASTER_SCHEDULER() /\* executes once per frame \*/
begin procedure
  s ← number of slots per frame
  $a_i$ ← 0; ∀i ∈ N
  Let B = {i ∈ N : $Q_i^{UG}$ is non-empty}
  while s > 0 and B ≠ ∅ do
    find i ∈ B such that Deadline($Q_i^{UG}$) ≤ Deadline($Q_j^{UG}$);∀j ∈ B
    UPDATE_QUEUE($Q_i^{UG}$)
    s ← s − 1
    $a_i$ ← $a_i$ + 1
  end while -continued APPENDIX B: Pseudo-code

```
    Let B = {i ∈ N : Q_i^HG is non-empty}
    while s > 0 B ≠ ∅ do
        c_i ← c_i + SIZE(Q_i^HG)/Σ_∀i SIZE(Q_i^H): ∀i ∈ B
        find i ∈ B such that c_i ≥ c_j;∀j ∈ B
        DEQUEUE(Q_i^HG)
        s ← s - 1
        a_i ← a_i + 1
        c_i ← c_i - 1
    end while
    Let B = {i ∈ N:Q_i^RG is non-empty}
    while s > 0 B ≠ ∅ do
        last ← NEXT_INDEX(last)DEQUEUE(Q_last^RG)
        s ← s - 1
        a_i ← a_i + 1
    end while
end procedure
*****************************************************
Algorithm 2: Initialization for new connections
*****************************************************
procedure
REAL_TIME_ACTIVATE(Q_m^R+)
    SLEEP(DEADLINE(Q_m^R+) - URGENT_PERIOD,
    REAL_TIME_PROMOTE(Q_m^R+))
end procedure
procedure
NON_REAL_TIME_ACTIVATE(Q_m^R-)
    cell ← DEQUEUE(Q_m^R-)
    ENQUEUE(Q_m^H, cell)
    SLEEP(CURRENT_TIME() + 1/r_m,
    NON_REAL_TIME_PROMOTE(Q_m^R-))
end procedure
*****************************************************
Algorithm 3: Slave Scheduling Algorithm
*****************************************************
procedure SLAVE_SCHEDULER() /* executes once per assigned slots */
begin procedure
    Let B = {m ∈ C_i:Q_m^U is non-empty}
    if B ≠ ∅ then
        find m ∈ such that DEADLINE(Q_m^U) ≤
        DEADLINE(Q_n^U); ∀_n ∈ B
        DEQUEUE(Q_m^U)
    else
        Let B = {m ∈ C_i:Q_m^H is non - empty}
        if B ≠ ∅ then
            c_m ← c_m + SIZE(Q_m^H)/Σ_∀m SIZE(Q_m^H);∀m ∈ B
            find m ∈ B such that c_m ≥ c_n;∀_n ∈ B
            DEQUEUE(Q_m^H)
            c_m ← c_m - 1
        else
            Let B = {m ∈ C_i:Q_m^R is non-empty}
            if B ≠ ∅ then
                last ← NEXT_INDEX(last)
                DEQUEUE(Q_last^R)
            end if
        end if
    end if
end procedure
*****************************************************
Algorithm 4: Promotion Algorithm
*****************************************************
procedure REAL_TIME_PROMOTE(Q_m^R+)
    while Q_m^R+ is not empty and DEADLINE(Q_m^R+) <
    CURRENT_TIME() + URGENT_PERIOD do
        cell ← DEQUEUE(Q_m^R+)
        ENQUEUE(Q_m^U, cell)
    end while
    if Q_m^R+ is not empty then
        SLEEP(DEADLINE(Q_m^R+) - URGENT_PERIOD,
        REAL_TIME_PROMOTE(Q_m^R+))
    end if
end procedure
procedure
NON_REAL_TIME_PROMOTE(Q_m^R-)
    if Q_m^R- is not empty then
        cell ← DEQUEUE(Q_m^R-)
        ENQUEUE(Q_m^H, cell)
        SLEEP(CURRENT_TIME() + 1/r_m,
        NON_REAL_TIME_PROMOTE(Q_m^R-))
    end if
end procedure
*****************************************************
```

We claim:

1. In a wireless asynchronous transfer mode (ATM) network having a plurality of wireless terminals (WTs) wirelessly coupled to an access point (AP), said AP having a master scheduler and a first slave scheduler, and said WTs each having a second slave scheduler, a method of scheduling comprising:

grouping traffic classes as real-time group and non-real-time group, said real-time group comprising real-time cells and said non-real-time group comprising non-real-time cells;

creating a deadline curve for the real-time group by said first or second slave scheduler, said deadline curve being a function which provides a time by which each of said real-time cells would expire, and approximating said deadline curve by linear segments;

providing sub-groups of said real-time cells, each of said sub-groups containing cells from a corresponding linear segment, and determining a number of said cells for each of said segments;

sending said number of cells for each segment from said first or second slave scheduler to said master scheduler, said number of cells being used to assign data slots by master scheduler;

grouping all cells by priority levels based on their urgency parameter, determining a number of non-real-time cells from each priority group, and sending said number of cells from said slave scheduler to said master scheduler, said number of cells being used to assign data slots by master schedule;

whereby cells from a group corresponding to a higher priority level are sent before cells from a group corresponding to a lower priority level.

2. The method of scheduling as recited in claim 1 wherein said real-time group comprises constant bit rate (CBR) and real-time variable bit-rate (VBR) traffic.

3. The method of scheduling as recited in claim 1 wherein said non-real-time group comprises non-real-time variable bit-rate (VBR), available bit-rate (ABR), and unspecified bit-rate (UBR).

4. The method of scheduling as recited in claim 1 wherein said deadline curve is approximated by three segments.

5. The method of scheduling as recited in claim 1 wherein said priority levels comprise highest priority level, high priority level, and lowest priority level, said highest priority level corresponding to urgent real time cells, said high priority level corresponding to high priority non-real time cells, said lowest priority level corresponding to non-urgent real-time cells and low priority non-real time cells.

6. The method of scheduling as recited in claim 1 wherein said urgency parameter for real-time cells is defined by an amount of remaining time the cells are allowed to wait.

7. The method of scheduling as recited in claim 1 wherein said urgency parameter for non-real-time cells is defined by whether the cells need to be served first to guarantee a long-term service rate to the corresponding VC.

8. The method of scheduling as recited in claim 5 wherein said non-urgent real-time cells are promoted from said lowest priority group to highest priority group when said cells' urgency parameter exceeds a pre-defined threshold level.

9. The method of scheduling as recited in claim 5 wherein said low priority non-real-time cells are promoted from said lowest priority group to said high priority group if a last promotion has been don more than a pre-defined number of units of time earlier.

10. The method of scheduling as recited in claim 9 wherein pre-defined number of units of time is 1/R where R represents a sustained cell rate (SCR) for nrt-VBR and minimum cell rate (MCR) for ABR.

* * * * *

UNITED STATES PATENT AND TRADEMARK OFFICE
CERTIFICATE OF CORRECTION

PATENT NO. : 6,747,976 B1
DATED : June 8, 2004
INVENTOR(S) : Brahim Bensaou et al.

It is certified that error appears in the above-identified patent and that said Letters Patent is hereby corrected as shown below:

Title page,
Item [73], Assignee, delete "Centre for Wireless Communications of The National University of Science" and insert -- Centre for Wireless Communications of The National University of Singapore --.

Signed and Sealed this

Sixth Day of September, 2005

JON W. DUDAS
*Director of the United States Patent and Trademark Office*